United States Patent [19]

Ohishi

[11] Patent Number: 5,732,291
[45] Date of Patent: Mar. 24, 1998

[54] CAMERA-SHAKE CORRECTING CAMERA

[75] Inventor: Sueyuki Ohishi, Tokyo, Japan

[73] Assignee: Nikon Corporation, Tokyo, Japan

[21] Appl. No.: 815,932

[22] Filed: Mar. 13, 1997

Related U.S. Application Data

[63] Continuation of Ser. No. 516,125, Aug. 17, 1995, abandoned, which is a continuation of Ser. No. 423,299, Apr. 18, 1995, abandoned, which is a continuation of Ser. No. 344,606, Nov. 18, 1994, abandoned, which is a continuation of Ser. No. 255,891, Jun. 7, 1994, abandoned, which is a continuation of Ser. No. 138,038, Oct. 19, 1993, abandoned.

[30] Foreign Application Priority Data

Nov. 5, 1992 [JP] Japan ............................ 4-295454

[51] Int. Cl.$^6$ ............................................. G03B 17/00
[52] U.S. Cl. ................................... 396/55; 396/303
[58] Field of Search ............................ 396/52, 53, 54, 396/55, 301, 303

[56] References Cited

U.S. PATENT DOCUMENTS

| | | | |
|---|---|---|---|
| 4,965,619 | 10/1990 | Skikaumi et al. | 354/430 X |
| 5,101,230 | 3/1992 | Shikaumi et al. | 354/430 |
| 5,155,520 | 10/1992 | Nagasaki et al. | 354/430 |
| 5,175,580 | 12/1992 | Shiomi | 354/430 X |
| 5,266,988 | 11/1993 | Washisu | 354/70 |
| 5,398,132 | 3/1995 | Otani | 359/557 |

*Primary Examiner*—Eddie C. Lee

[57] ABSTRACT

A camera-shake correcting camera, in which a camera-shake correcting device forming a part of a phototaking optical system is moved by a plurality of drive devices to correct camera shake and drive control of the plurality of drive devices is performed by controlling a drive duty of energization time in a predetermined period, comprises: a battery check device for checking a current supply capability of a power battery for operation of the camera; a drive duty limiting device for inhibiting the plurality of drive devices for driving the camera-shake correcting device from driving the camera-shake correcting device at a drive duty more than a set limit value; and a drive duty limit value setting device for changing to set the limit value of the drive duty limiting device in accordance with an output value from the battery check device.

13 Claims, 14 Drawing Sheets

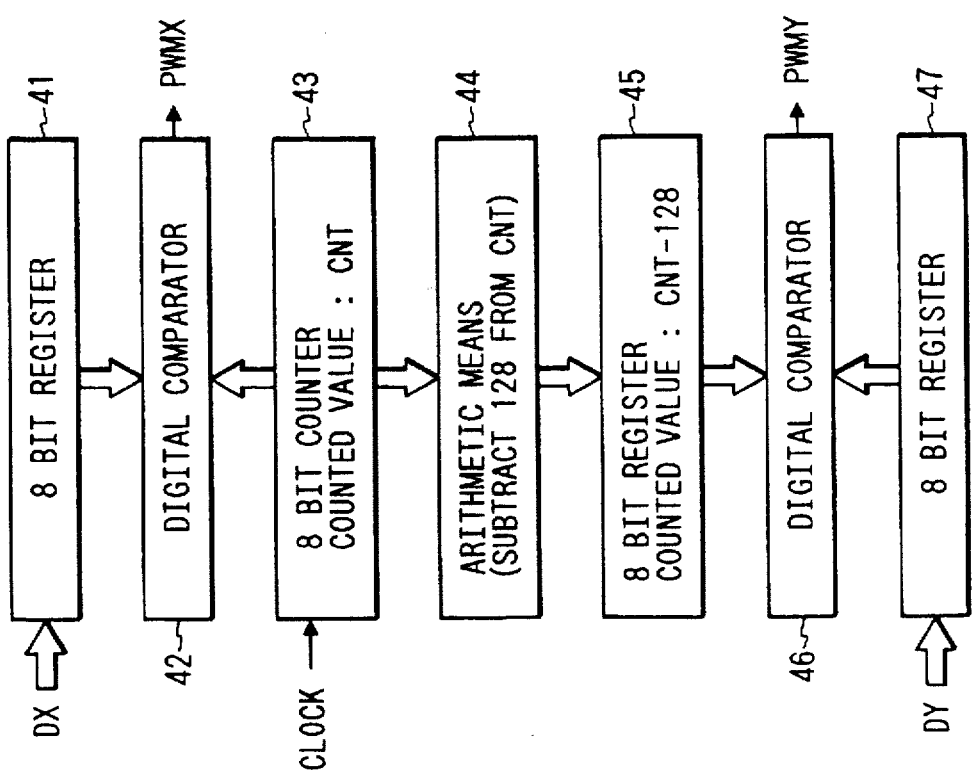
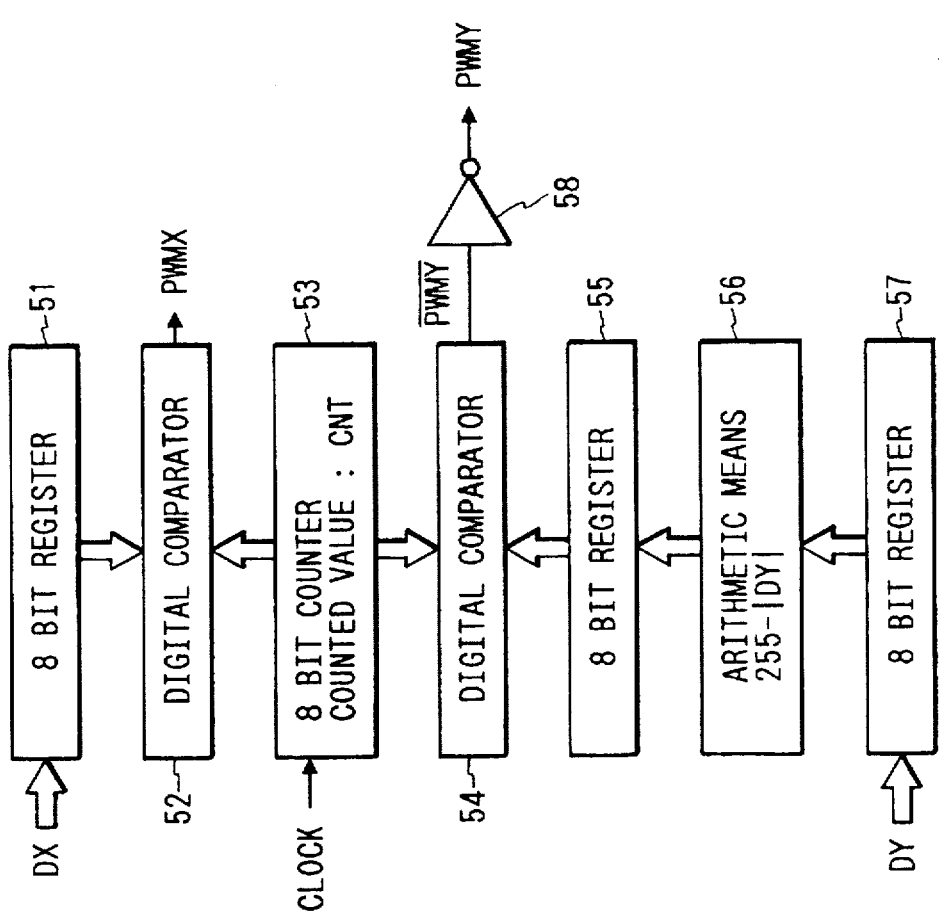

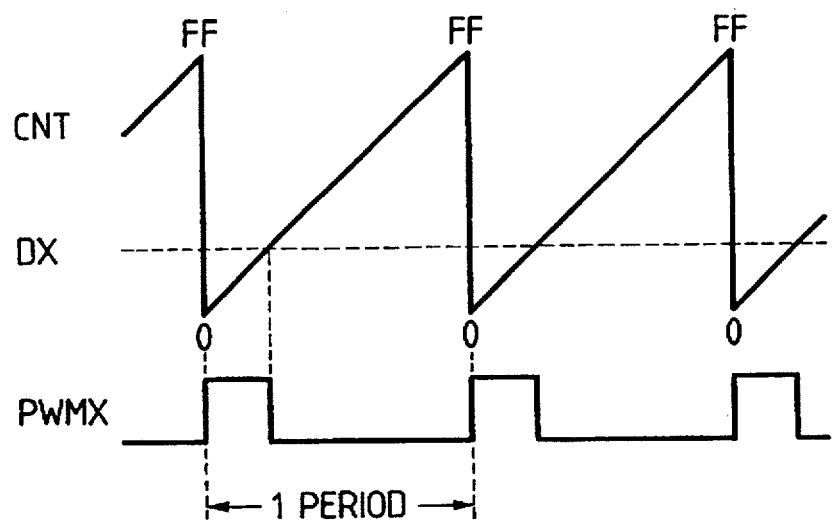
FIG. 5A
FIG. 5B
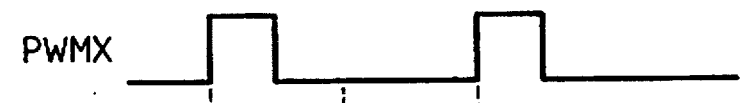
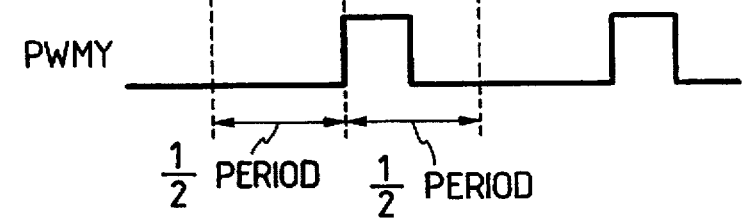
FIG. 6A PWMX
FIG. 6B PWMY
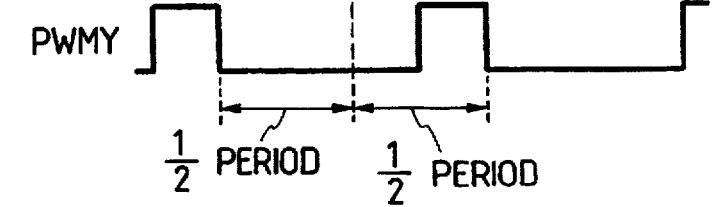
FIG. 6C PWMX
FIG. 6D $\overline{PWMY}$
FIG. 6E PWMY

;# CAMERA-SHAKE CORRECTING CAMERA

This is a continuation of application Ser. No. 08/516,125, filed Aug. 17, 1995, now abandoned, which is a continuation of Ser. No. 08/423,299, filed Apr. 18, 1995, now abandoned, which is a continuation of Ser. No. 08/344,606, filed Nov. 18, 1994, now abandoned, which is a continuation of Ser. No. 08/255,891, filed Jun. 7, 1994, now abandoned, which is a continuation of Ser. No. 08/138,038, filed Oct. 19, 1993, now abandoned.

BACKGROUND OF THE INVENTION

1. Field of the Invention

The present invention relates to a camera with a camera-shake correcting function.

2. Related Background Art

There are cameras with a camera-shake correcting function which are conventionally known. For example, in a camera in which an amount of camera shake is detected by a camera-shake amount detecting sensor or the like, a camera-shake correcting lens (as is often called simply as a correction lens) is shifted based on the detected amount to suppress the camera shake (which is sometimes called a shake-proof control).

For example, if an angular velocity sensor is used for detection of a camera shake amount, the correction lens is shifted at an appropriate velocity according to an output value from the angular velocity sensor, to change the optical axis, and thereby to cancel the camera shake. The angular velocity sensor is a detecting device which changes its output value depending upon a change in angular velocity, and is arranged to momentarily detect the change in angular velocity due to the camera shake. An output from the angular velocity sensor is sent a control means such as a CPU to calculate a target moving velocity of the correction lens and to control the speed of rotation of a DC motor. The rotation of the DC motor is reduced by gears and the rotation of gears is converted into a linear motion to drive the correction lens. The correction lens is so arranged that detecting means, such as an interrupter, reads a velocity or a position of the correction lens, that the read velocity or position is sent to the control means such as the CPU, and that the control means effects negative feedback to the rotational number of a DC motor to thereby control the velocity of the correction lens.

In the thus arranged camera-shake correcting system, the correction lens is controlled by a DC motor and the correction lens must be moved in at least two directions to correct the camera shake, so that at least two motors must be simultaneously driven. Also, if the camera shake correction is performed during exposure, another DC motor for controlling the shutter has to be operated at the same time. Accordingly, a large current is necessary for performing these controls.

The shake-proof control is normally carried out after the correction lens is moved to a predetermined position (which is usually the center of a movable range on the two axes). To locate the correction lens at the center will be referred to as a centering process. In addition, after operation of the shake-proof control the correction lens sometimes needs to be moved to a predetermined position (which is a reset position which may be a position different from the center position in the centering process). The movement of correction lens to the reset position will be referred to as a reset process of correction lens. In this case, the centering or the reset of correction lens is often carried out by simultaneously driving the two motors for respective axes to avoid a time delay. Since the two motors must be simultaneously driven in such an arrangement, a large current is also necessary for controlling the two motors.

Normally, the camera system can operate circuits therein by a battery. A battery can supply a sufficient current at the beginning of use but decreases its current supply capability with continued use up to a final state. In the final state the camera system cannot operate in a normal condition. This also happens when the camera is used at a low temperature. At a low temperature even a new battery will lower its current supply capability, so that the camera system might fail to operate in the normal condition. For example, it is considered that either one of these factors drops a voltage supplied to a micro computer controlling the camera system to thereby cause runaway of a micro computer.

A conventional measure to avoid it is as follows. A constant current load is forced on a dummy. Whether the camera system can operate in the normal condition is judged by a battery voltage with the load (which is frequently called as a battery check voltage or BC voltage). If the voltage is lower than a certain battery voltage (as is sometimes called as battery check warning voltage or BC warning voltage), the sequence of camera is inhibited and a user is informed of the waste of the battery by some means.

However, the camera-shake correcting camera has the additional load of at least two motors on the battery as compared with the conventional cameras without the camera-shake correcting function. Therefore, the camera-shake correcting camera has a problem that the BC voltage must be set higher than that in conventional cameras without the camera-shake correcting function in order to assure the normal operation of the camera system with an additional load of two motors.

SUMMARY OF THE INVENTION

The present invention has been accomplished taking the above problem into consideration. It is an object of the present invention to provide a camera with a camera-shake correcting function, which can assure the normal operation of camera system without increasing the BC voltage; even though it is a camera with a camera shake correction.

Achieving this object, the present invention provides a camera-shake correcting camera in which camera-shake correcting means forming a part of a phototaking optical system is moved by a plurality of drive means to correct camera shake and drive control of said plurality of drive means is performed by controlling a drive duty of energization time in a predetermined period, comprising:

battery check means for checking a current supply capability of a power battery for operation of the camera;

drive duty limiting means for inhibiting said plurality of drive means for driving said camera-shake correcting means from driving said camera-shake correcting means at a drive duty more than a set limit value; and drive duty limit value setting means for changing to set the limit value of said drive duty limiting means in accordance with an output value from said battery check means.

Also, the present invention provides a camera-shake correcting camera in which camera-shake correcting means, forming a part of a phototaking optical system, is moved by a plurality of drive means to correct camera shake, and drive control of said plurality of drive means is performed by controlling a drive duty of energization time in a predetermined period, comprising:

battery check means for checking a current supply capability of a power battery for operation of the camera;

drive control means having a first home position drive mode in which said plurality of drive means are simultaneously drive-controlled to move said camera-shake correcting means to a predetermined position and a second home position drive mode in which said plurality of drive means are separately driven one after another to move said camera-shake correcting means to the predetermined position; and drive mode judging means for judging whether said camera-shake correcting means should be driven to the predetermined position either in said first home position drive mode or in said second home position drive mode in accordance with an output value from said battery check means;

wherein said drive control means drive-controls said plurality of drive means in accordance with the output value from said drive mode judging means.

The camera-shake correcting cameras, so arranged, can prevent the camera system from failing to operate due to a drop of battery voltage and can permit the BC warning voltage to be lowered as compared to that in conventional cameras. The drive duty limit value setting means is provided for changing a limit value of a drive duty limiting means according to an output value from the battery check means. The drive mode judging means is provided for judging if the camera-shake correcting means is to be driven to the predetermined position either in the first home position drive mode or in the second home position drive mode in accordance with an output value from the battery check means. Or as an alternative, the energization timing control means is provided for shifting the energization timings of the plural drive means relative to each other in a certain energization time.

BRIEF DESCRIPTION OF THE DRAWINGS

FIG. 4A and FIG. 4B are block diagrams respectively to show an example of energization timing control circuit 4 in an embodiment of camera-shake correcting camera according to the present invention;

FIGS. 5A and 5B is a waveform diagram to show the operation of digital comparator 1 in an energization timing control circuit 4 in an embodiment of camera-shake correcting camera according to the present invention;

FIGS. 6A–6B and FIGS. 6C–6E are waveform diagrams to show the operation of energization timing control circuit 4 in an embodiment of camera-shake correcting camera according to the present invention;

DESCRIPTION OF THE PREFERRED EMBODIMENTS

The embodiments of the present invention will be described in detail with reference to the drawings.

Figure 1:
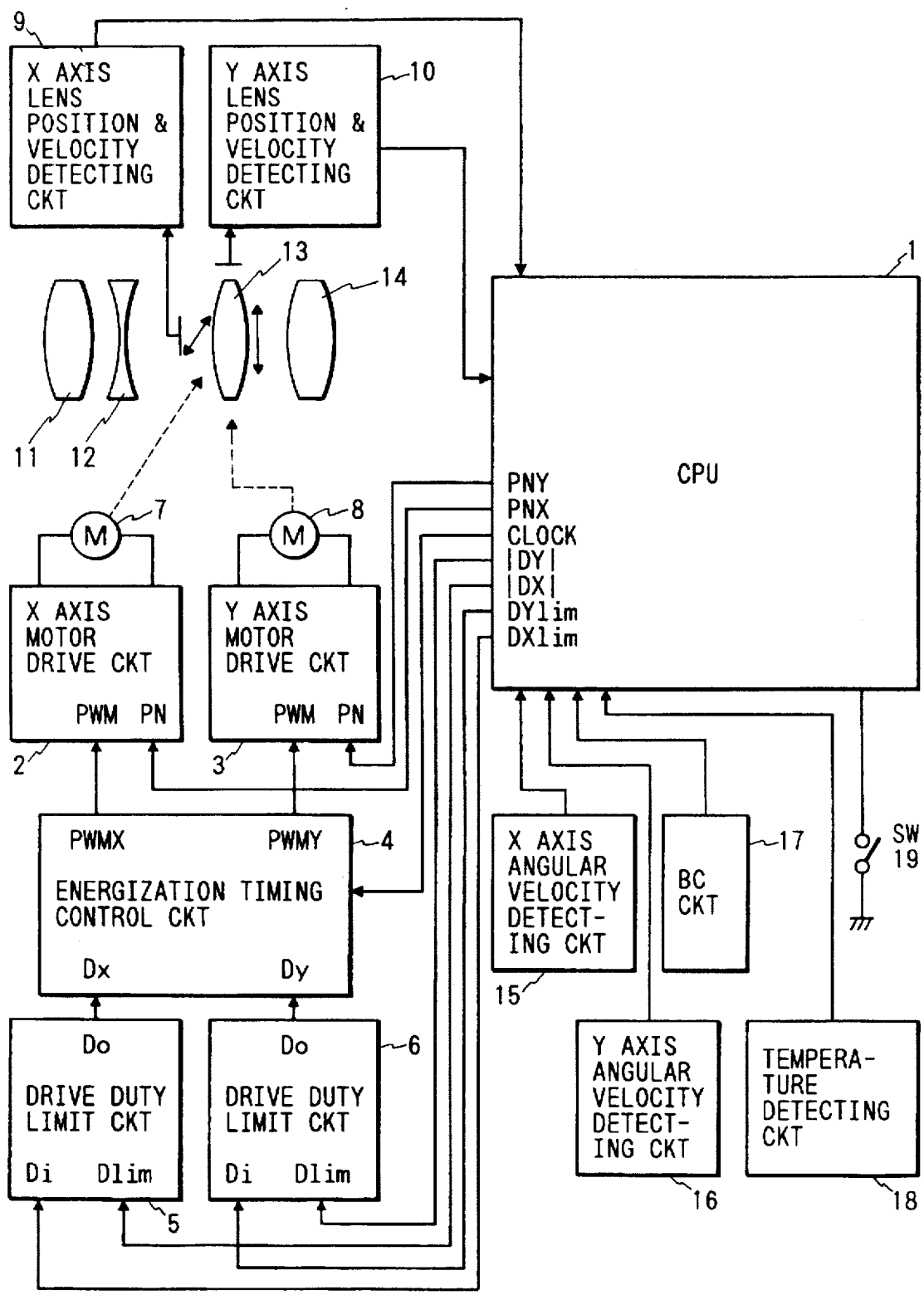
FIG. 1 is a circuit diagram to show an embodiment of camera-shake correcting camera according to the present invention.

FIG. 1 is a circuit diagram to show an embodiment of a camera-shake correcting camera according to the present invention.

The construction of control circuit is first described referring to FIG. 1.

An angular velocity due to camera shake is calculated in the X-axis direction, or in the Y-axis direction perpendicular thereto, from an output value from an X-axis angular velocity detecting circuit 15 or from a Y-axis angular velocity detecting circuit 16. Among phototaking lenses 11, 12, 13 and 14, a camera-shake correcting lens 13 (as will be referred to simply as a correction lens) is driven by a motor 7 or by a motor 8 at a velocity according to the detected angular velocity of camera shake, in the direction of thus detected angular velocity, to change the optical axis so as to cancel the camera shake.

The present embodiment will be described as an example in which the rotation speed control of the motor is based on the PWM (Pulse Width Modulation) control. Normally, the PWM control is a method for controlling a speed by changing an energization time at a constant period, that is, by changing a duty in which a motor is on.

Connected to a CPU 1 are: the X-axis angular velocity detecting circuit 15, for detecting an angular velocity of camera shake in a direction perpendicular to the optical axis of phototaking lenses (which is defined as the X axis); the Y-axis angular velocity detecting circuit 16, for detecting an angular velocity of camera shake in the direction perpendicular to the optical axis of phototaking lenses and to the direction in which the X-axis angular velocity detecting circuit 15 detects an angular velocity (which is defined as the Y axis); a BC circuit 17, for checking a current supply capability of a battery which operates all circuits; a temperature detecting circuit 18, for detecting a temperature, a half depression switch 19 which is turned on by a half depression of shutter release button; an X-axis motor drive circuit 2 and a Y-axis motor drive circuit 3 for actuating a motor 7 and a motor 8 to shift the correction lens 17 in the X-axis direction and in the Y-axis direction; respectively, an energization timing control circuit 4 for controlling energization timings of the X-axis motor drive circuit 2 and the Y-axis motor drive circuit 3; an X-axis drive duty limiting circuit 5 and a Y-axis drive duty limiting circuit 6 for limiting duty values for drive of the motor 7 and the motor 8 in the X-axis direction and in the Y-axis direction; respectively, and an X-axis lens position and velocity detecting circuit 9 and a Y-axis lens position and velocity detecting circuit 10 for detecting a position and a velocity of correction lens 13 in the X-axis direction and in the Y-axis direction, respectively. The power is supplied from a battery to all circuits including the CPU 1, though not shown.

The X-axis angular velocity detecting circuit 15 and the Y-axis angular velocity detecting circuit 16 change their output values depending upon an angular velocity caused by camera shake, and the CPU 1 reads the output values to detect the angular velocity of camera shake.

Rotation of motor 7 or motor 8 is converted by appropriate gears (not shown) into a linear motion to drive the correction lens 13 so as to correct the camera shake.

The X-axis lens position and velocity detecting circuit 9 and the Y-axis lens position and velocity detecting circuit 10 are respectively for detecting a position, a moving speed and a moving direction of correction lens 13.

The CPU 1 is a one-chip micro computer, which controls the sequence of camera operation. The CPU 1 has further functions, such as a time-counting timer function to measure a time and a function to provide a clock output of a certain period to the energization timing control circuit 4.

Also, the CPU 1 calculates drive directions and drive duties for the motor 7 and the motor 8 at a necessary timing from outputs from the X-axis angular velocity detecting circuit 15, outputs from the Y-axis angular velocity detecting circuit 16, and outputs from the X-axis lens position and velocity detecting circuit 9, and outputs from the Y-axis lens position and velocity detecting circuit 10. The drive directions are output through PNX terminal and through PNY terminal to the X-axis motor drive circuit 2 and to the Y-axis motor drive circuit 3 to determine rotational directions of the motor 7 and the motor 8, respectively. The drive duties are output from the |DX| terminal and from the |DY| terminal to pass through the drive duty limiting circuit 5, and through the drive duty limiting circuit 6, then pass through the energization timing control circuit 4 to the X-axis motor drive circuit 2 and to the Y-axis motor drive circuit 3, respectively.

The circuit blocks shown in FIG. 1 will be described one by one in the following. First described are the X-axis motor drive circuit 2 and the Y-axis motor drive circuit 3.

Figure 2:
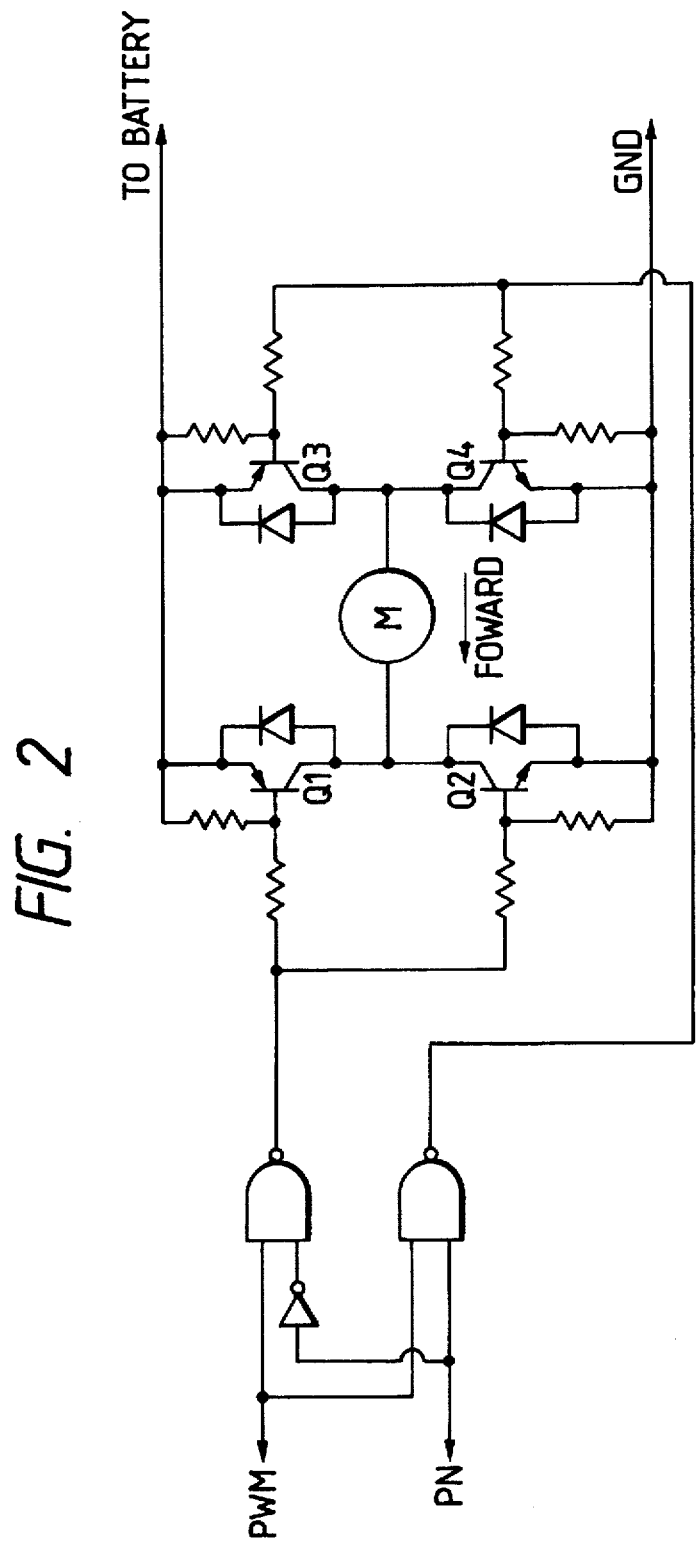
FIG. 2 is a circuit diagram to show an example of an X-axis motor drive circuit 2 and a Y-axis motor drive circuit 3 in an embodiment of a camera-shake correcting camera according to the present invention.

The X-axis motor drive circuit 2 and the Y-axis motor drive circuit 3 are substantially identical to each other, each of which may be, for example, a circuit as shown in FIG. 2. Each circuit is so arranged that a rotation direction of motor 7 or motor 8 is determined by a level of a PN terminal and that a duty ratio for driving each motor is changed by a time ratio of a High level or Low level of PWM terminal. Table 1 is a table of truth values to show levels at a PWM terminal and at a PN terminal and drive conditions of motor 7 or motor 8 in the circuit in FIG. 2.

TABLE 1

| Input | | |
|---|---|---|
| PWM | PN | Motor drive |
| Low | don't care | Short brake |
| High | Low | Backward rotation |
| High | High | Forward rotation |

With a Low level of PWM terminal, transistors Q1 and Q3 are turned off while transistors Q2 and Q4 are turned on regardless of the phase of PN terminal. Then the motor 7 or the motor 8 is in a short brake state. If the PWM terminal is at a High level and the PN terminal at a Low level, the transistors Q1 and Q4 are on but the transistors Q2 and Q3 are off. Then the motor 7 or the motor 8 is driven backward. If the PWM terminal is at a High level and the PN terminal at a High level, the transistors Q1 and Q4 are off but the transistors Q2 and Q3 are on. Then the motor 7 or the motor 8 is driven forward.

The CPU 1 can control the rotation direction of motor 7 or motor 8 by setting the PN terminal at the High level or at the Low level and the drive duty ratio of motor 7 or motor 8 by controlling the duty ratio of the PWM terminal. The circuit in FIG. 2 shows an example of the the present embodiment, and therefore the setting of the rotation direction and the control of the drive duty ratio may be accomplished by another circuit different from it or by another control method of CPU 1.

Next described are the drive duty limiting circuits 5 and 6 shown in FIG. 1.

Figure 7:
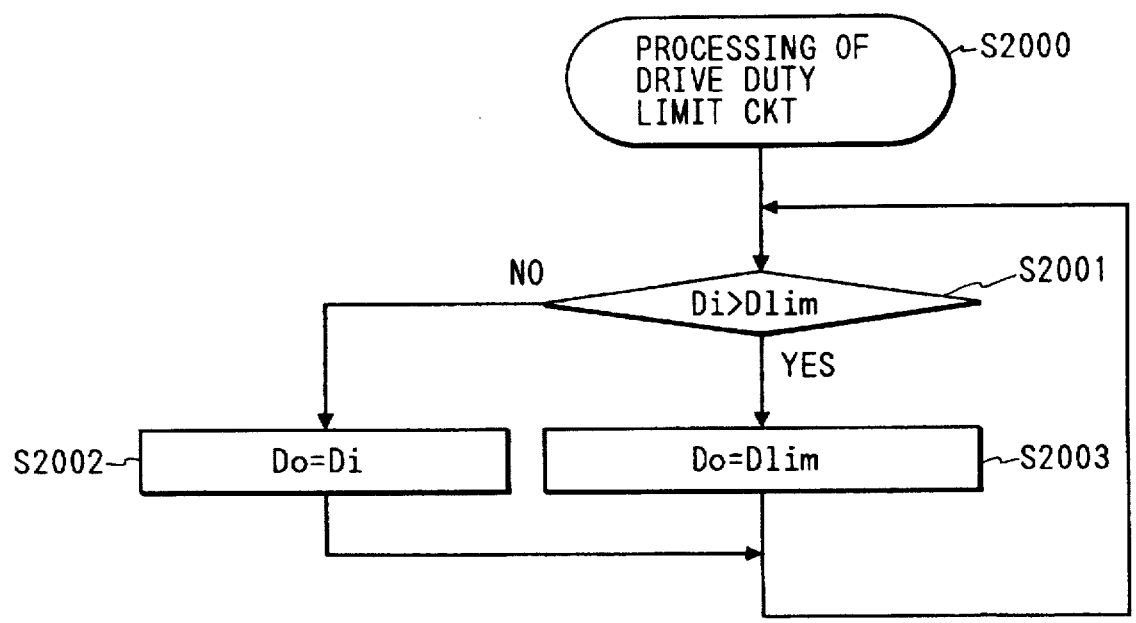
FIG. 7 is a flowchart to show the operation of a drive duty limiting circuit 5 and a drive duty limiting circuit 6 in an embodiment of camera-shake correcting camera according to the present invention.

The drive duty limiting circuit, either 5 or 6, is a circuit with a limit value of duty being set (which will be referred to as Dlim), which, if a duty value (Di) input thereinto is not more than Dlim, outputs the input value Di through Do as is. But, if the input duty value Di exceeds Dlim, the circuits outputs the duty of Dlim value through Do. FIG. 7 is a flowchart to show the process of this circuit for the sake of easy understanding thereof. In FIG. 7, the flow starts from Step S2000. Then at Step S2001 whether Di is larger than Dlim is judged. If Di is larger than Dlim then Dlim is output to Do at Step S2003; if otherwise Di is output to Do at Step S2002. After completion of the process at Step S2002 or at Step S2003, the flow returns to Step S2001 to repeat the same processing.

Next described is the energization timing control circuit 4 shown in FIG. 1.

The energization timing control circuit 4 is a circuit which is arranged to shift the energization timing of motor 7 driven by the X-axis motor drive circuit 2 relative to that of motor 8 driven by the Y-axis motor drive circuit 3. There are two examples of the energization timing control circuit 4 shown in FIG. 4A and in FIG. 4B. Described with FIG. 4A and FIG. 4B is how to shift the energization timing between the motor 7 and the motor 8 relative to each other.

In FIG. 4A, count clock CLOCK is sent from the CPU 1 to 8-bit counter 43, and the 8-bit counter 43 continues counting up CLOCK (to set a count value as CNT) and outputs the count value CNT to digital comparator 42. Also, when a value of Dx is set at 8-bit register 41, the 8-bit register 41 outputs this value to the digital comparator 42. The digital comparator 42 compares the output value from 8-bit register 41 with the output value from 8-bit counter 43. If the output from 8-bit register 41 is larger than the output from 8-bit counter 43, then the comparator 42 outputs a signal of High level to the PWMX terminal; if otherwise it outputs a signal of Low level to the PWMX terminal. FIGS. 5A and 5B show this operation in the form of waveform diagram. A PWM output with a period of 256 pulses of CLOCK and with a duty of Dx/256% is obtained at the PWMX terminal.

On the other hand, the output of 8-bit counter 43 is also output to arithmetic means 44 to calculate (CNT-128), and a value of (CNT-128) thus obtained is output to 8-bit register 45. Also, when a value of Dy is set at 8-bit register 47, a digital comparator 46 compares the output value from 8-bit register 45 with the output value from 8-bit register 47. If the output from 8-bit register 47 is larger than the output from the 8-bit register 45, the comparator 46 outputs a signal of High level to the PWMY terminal; if otherwise the comparator outputs a signal of Low level to the PWMY terminal. A PWM output with a period of 256 pulses of CLOCK and with a duty of Dy/256% is obtained at the PWMY terminal similarly as at the PWMX terminal.

Comparing the output through the PWMX terminal with the output through the PWMY terminal, the output through the PWMX terminal and the output through the PWMY terminal are shifted relative to each other by a half of period (128 CLOCK pulses), because the arithmetic means 44 subtracts 128 from the CNT value. FIGS. 6A and 6B show the shift of outputs. In this example the values of Dx and Dy are set to obtain outputs of 25% at the PWMX terminal and at the PWMY terminal.

FIG. 4B shows another circuit example of the energization timing control circuit 4.

In FIG. 4B, count clock CLOCK is sent from CPU 1 to 8-bit counter 53, and the 8-bit counter 53 continues counting up CLOCK (to set a count value as CNT) and outputs the count value CNT to digital comparator 52. Also, when a value of Dx is set at 8-bit register 51, the 8-bit register 51 outputs this value to the digital comparator 52. The digital comparator 52 compares the output value from 8-bit register 51 with the output value from 8-bit counter 53. If the output from 8-bit register 51 is larger than the output from the 8-bit counter 53 then the comparator outputs a signal of High level to the PWMX terminal; if otherwise the comparator outputs a signal of Low level to the PWMX terminal. By this operation, a PWM output with a period of 256 pulses of CLOCK and with a duty of Dx/256% is obtained at the PWMX terminal.

On the other hand, the output from 8-bit counter 53 is also supplied to digital comparator 54. When a value of Dy is set at 8-bit register arithmetic means 56 calculates (255-Dy) to output the calculated value to 8-bit register 55. The digital comparator 54 compares the output value from 8-bit counter 53 with the output value from 8-bit register 55. If the output value from 8-bit register 55 is not less than the value from 8-bit counter 53, then the comparator outputs a signal of High level through the $\overline{PWMY}$ terminal; if otherwise the comparator outputs signal of Low level through the $\overline{PWMY}$ terminal. A signal through the $\overline{PWMY}$ terminal is first inverted by an invertor 58 then to be output through the PWMY terminal. By this operation, a PWM output with a period of 256 pulses of CLOCK and with a duty of Dy/256% is obtained at the PWMY terminal similarly as at the PWMX terminal.

FIGS. 6C–6E show the outputs through the PWMX terminal and through the PWMY terminal. FIGS. 6c–6E show an example in which the values of Dx and Dy are set to obtain outputs of 25% through PWMX and through PWMY.

As described above, the energization timing control circuit 4 can permit the energization timing of PWMX output to be deviated from that of PWMY output. Therefore, the use of energization timing control circuit 4 can avoid simultaneous energization of motor 7 and motor 8, which enables reduction of load on the battery.

Also, if the limit duty (Dlim) of drive duty limiting circuit 5 or drive duty limiting circuit 6 is set to below 50%, simultaneous energization of motor 7 and motor 8 will never happen, which enables further reduction of load on the battery.

The outputs were Dx/256% and Dy/256% for inputs Dx and Dy in the above circuit examples of energization timing control circuit 5, but it is assumed in the following description for simplicity that outputs of Dx % and Dy % are obtained for inputs Dx and Dy.

The entire main flowchart of CPU 1 is next described in general, and a flow of the portion related to the present embodiment is then described with reference to FIG. 8.

When the half depression switch 19 of camera is turned on, the correction lens 13 is moved from the reset position to the center position both on the X axis and on the Y axis and then stops thereat (which is the centering process of correction lens 13). The camera shake is then detected by the X angular velocity detecting circuit 15 and the Y angular velocity detecting circuit 16. The camera shake correction is effected by moving the correction lens 13, based on the detected camera shake amount, so as to cancel the camera shake detected. This will be called a shake-proof process. This shake-proof process is constantly continued as long as the half depression switch 19 is on. When the half depression switch 19 is turned off, the correction lens 13 is moved to the original reset position and is stopped thereat (which is the reset process of correction lens 13).

Figure 8:
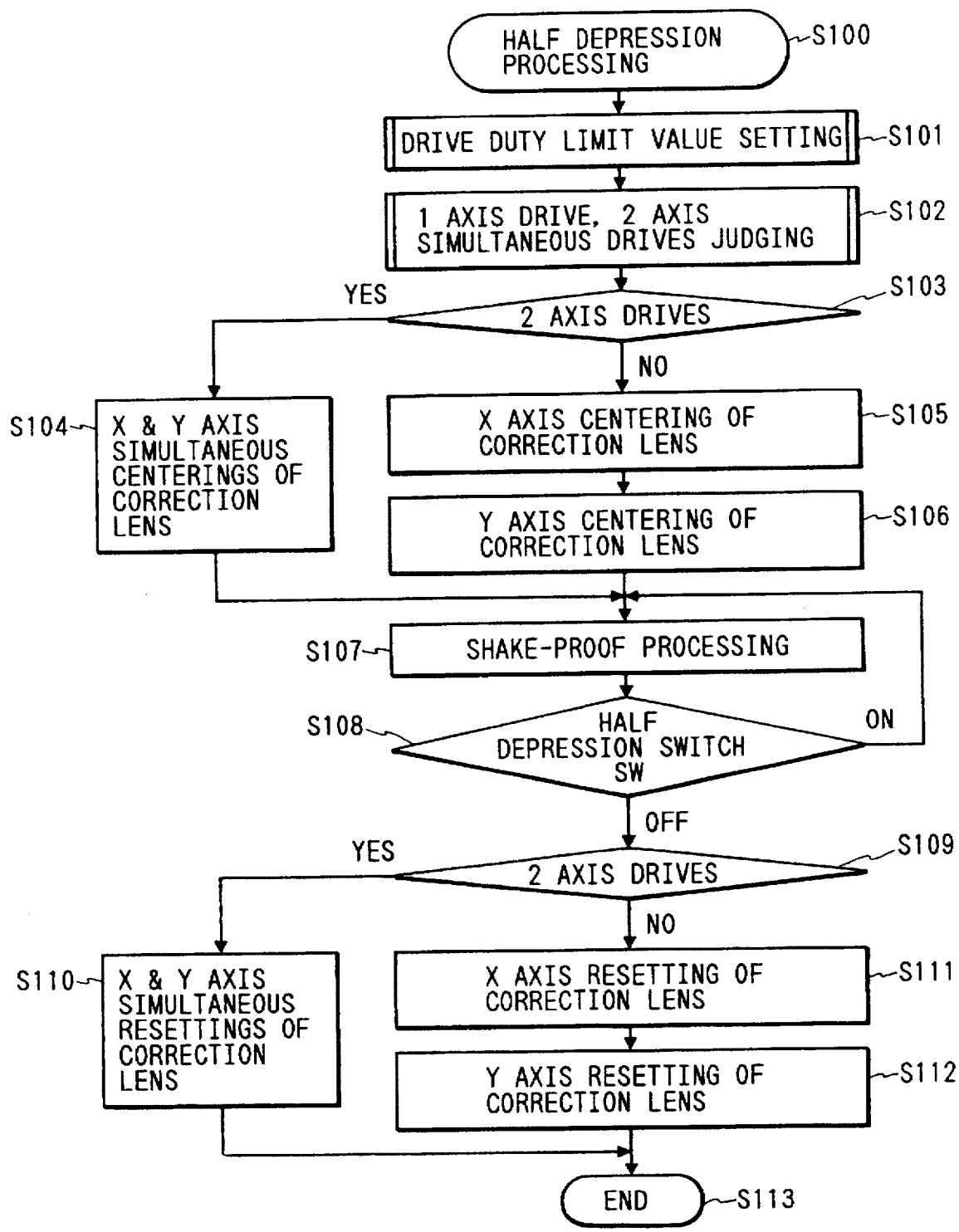
FIG. 8 is a flowchart to show the operation of an embodiment of a camera-shake correcting camera according to the present invention.

Among the software processing of CPU 1 as described above, the flow of the portion related to the present embodiment is next described referring to FIG. 8 to show a main flowchart thereof.

The processing in FIG. 8 starts from Step S100 when the half depression switch 19 is turned on. First, at Step S101 limit values of drive duty are set for motor 7 and motor 8. The details of this step will be described later. Next at Step S102 it is judged whether the centering of correction lens 13 should be performed simultaneously for two axes or separately for one after another axis. The details of this step will be also described later. If 2-axis drive (drive of double axes) is confirmed at Step S103 based on the judgement result at Step S102, the centering of the correction lens is conducted simultaneously along two axes (along X axis and along Y axis) at Step S104 (which will be referred to as 2-axis simultaneous drive). After the correction lens 13 is stopped at the center, the flow goes to Step S107.

Conversely, if a single axis drive is judged at Step S102, the centering is carried out along the X axis at Step S105. After and after the X axis centering, the centering along the Y axis is then carried out at Step S106. After completion of process at Step S106, the flow goes to Step S107. At Step S107 and Step S108 the shake-proof control process is constantly repeated as long as the half depression switch 19 is on.

When the half depression switch 19 is turned off, the flow advances from Step S108 to Step S109. At Step S109 the flow is directed to Step S110 if the double-axis drive is confirmed, based on the judgement result at Step S102. At Step S110 the correction lens is reset simultaneously along two axes (along the X axis and along the Y axis), and the correction lens 13 is stopped at the reset position. Then the flow goes to Step S113 to complete the processing in the present embodiment. The reset drive process is performed along the X axis at Step S111. After completion of this process, the reset drive process is performed along the Y axis at Step S112. Then the processing is finished at Step S113.

Next described is the limit value setting process of drive duty at Step S101 in FIG. 8.

FIGS. 9, 10, 11, 12, 13 and 14 show six examples of a limit value setting process, by either one of which the limit value of drive duty can be set.

Figure 9:
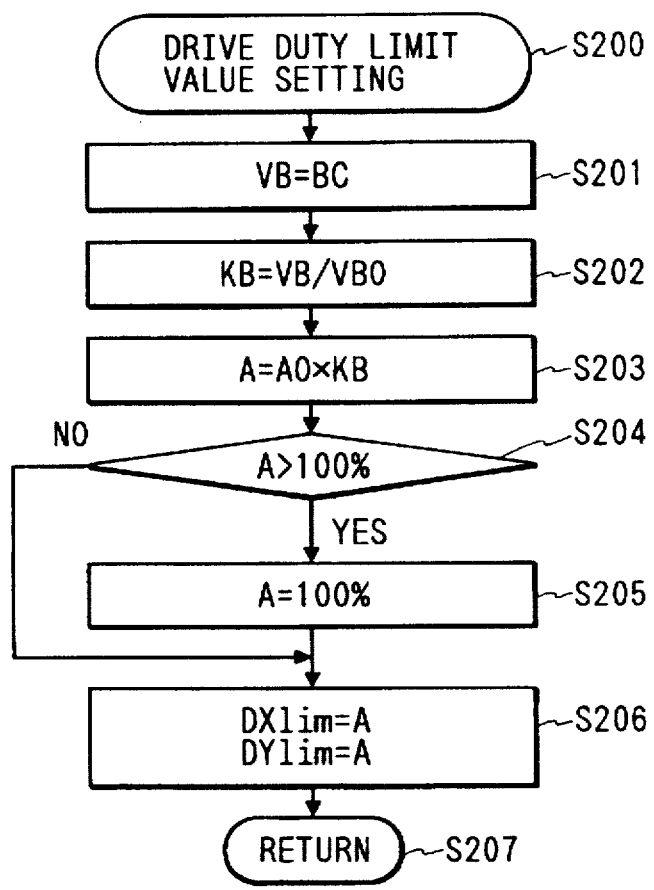
FIG. 9 is a flowchart to show an example of limit value setting process of a drive duty in an embodiment of a camera-shake correcting camera according to the present invention.
Figure 10:
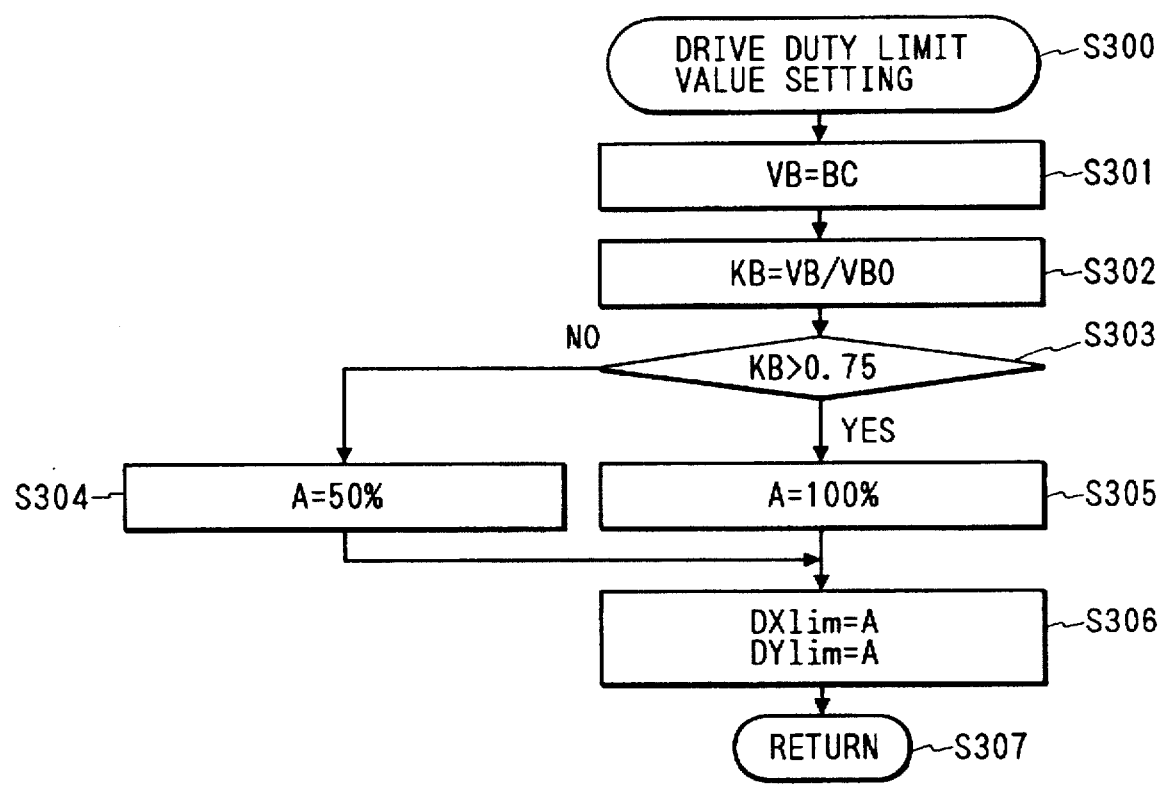
FIG. 10 is a flowchart to show an example of a limit value setting process of a drive duty in an embodiment of camera-shake correcting camera according to the present invention.

First described with reference to FIG. 9 and FIG. 10 are first and second examples in which the limit value of the drive duty is set by a battery check voltage.

Let VB be an output voltage from BC circuit 17. Assuming now that a new battery can provide a voltage of VB0 at an ordinary operating temperature, the current supply capability KB of the battery can be expressed by the following equation (KB will be called as battery index).

$$KB = VB/VB0$$

When a new battery is used at the ordinary temperature, $KB \simeq 1$. This value gradually decreases as the battery is being discharged. The drive duties are set as described below from the thus obtained value of KB. In a first example, the drive duties are set as setting values expressed by the following equations.

$$DXlim = A0 \times KB \text{ (which should be not more than 100\%)}$$

$$DYlim = A0 \times KB \text{ (which should be not more than 100\%)}$$

In the equations A0 is a positive constant.

In the second example values of drive duty are set as follows.

If KB>0.75,

DXlim=100%;

DYlim=100%.

For other KB,

DXlim=50%;

DYlim=50%.

Figure 3A:
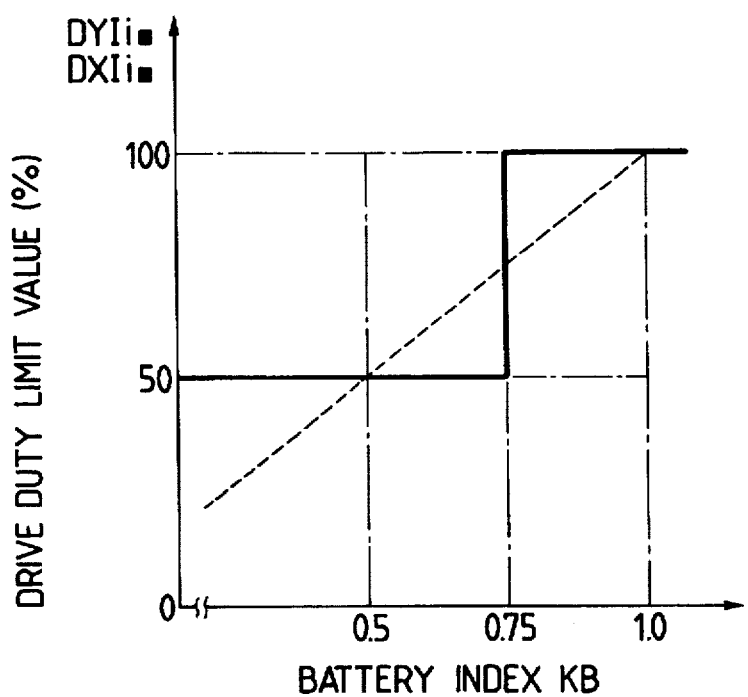
FIG. 3A and FIG. 3B are characteristic diagrams to show an example of limit value setting of a drive duty in an embodiment of a camera-shake correcting camera according to the present invention.

FIG. 3A shows the relation between the KB value and the limits of drive duty. In FIG. 3A, a broken line shows a case of A0=100 in the first example and a solid line shows the second example.

The first example is next described referring to the flowchart in FIG. 9. Starting from Step S200, the flow goes to Step S201 to set the value of the output voltage (BC voltage) from BC circuit 17 into the variable VB. Next, at Step S202 the value of KB=VB/VB0 is calculated. After obtaining KB, the flow goes to Step S203. At Step S203 A=A0×KB is calculated. Then the flow goes to Step S204 to judge if A>100%. Unless A>100% then the flow goes to Step S206 while if A>100% then the flow goes to Step S205 to set A=100%. Then the flow goes to Step S206. At Step S206 the limit value set for A is output through the DXlim terminal or through the DYlim terminal. Then at Step S207 the limit value setting process of drive duty is completed.

The second example is next described referring to the flowchart in FIG. 10. Starting from Step S300, the flow goes to Step S301 to set the value of the output voltage (BC voltage) from BC circuit 17 into the variable VB. Next, at Step S302 KB=VB/VB0 is calculated to obtain KB. Then the flow goes to Step S303. At Step S303 whether KB>0.05 is judged. Unless KB>0.75 then the flow goes to Step S304 to set A=50%. Then the flow goes to Step S306. If KB>0.75 then the flow goes to Step S305 to set A=100%. After that, the flow goes to Step S306. At Step S306 the limit value set for A is output through the DXlim terminal or through the DYlim terminal. At Step S307 the limit value setting process of drive duty is finished.

Figure 11:
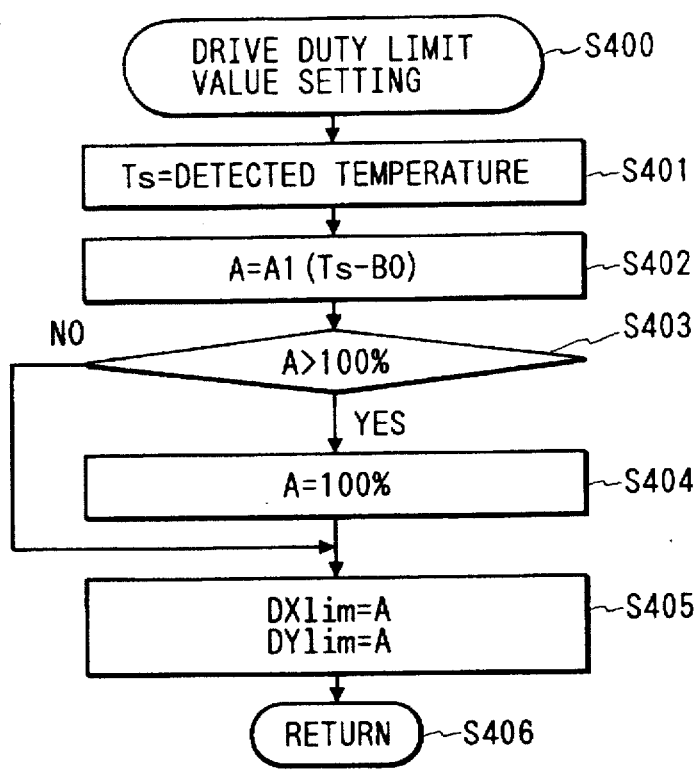
FIG. 11 is a flowchart to show an example of a limit value setting process of a drive duty in an embodiment of a camera-shake correcting camera according to the present invention.
Figure 12:
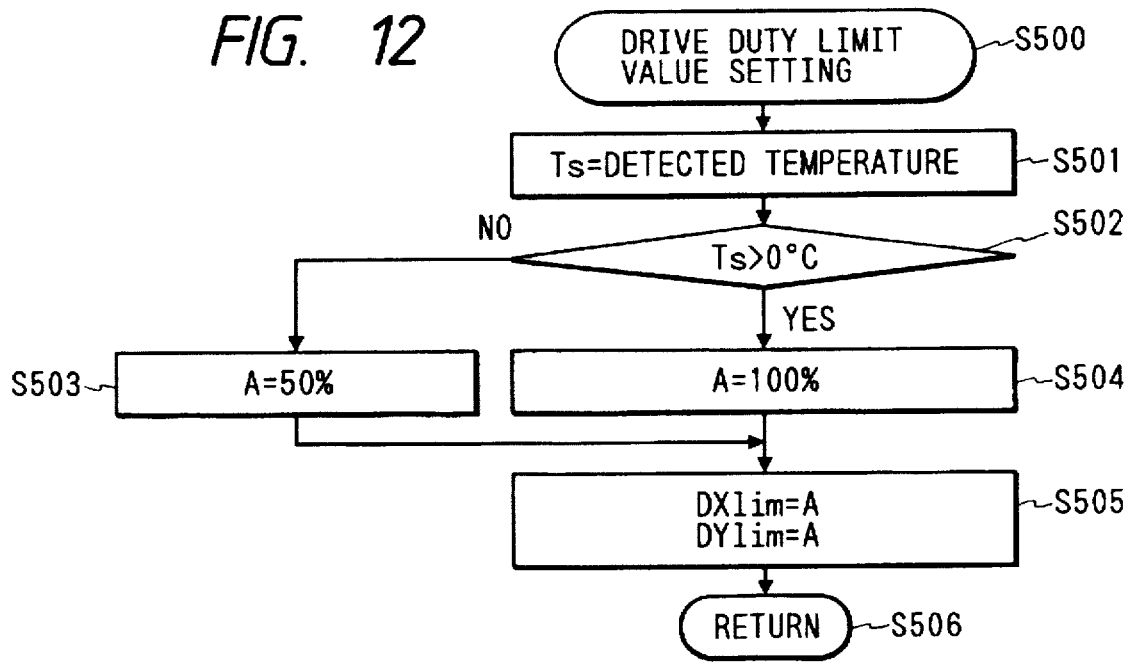
FIG. 12 is a flowchart to show an example of a limit value setting process of a drive duty in an embodiment of a camera-shake correcting camera according to the present invention.

Next described with FIG. 11 and FIG. 12 are third and fourth examples in which the limit value of drive duty is set based on temperature detection.

Let Ts be a detected temperature by the temperature detecting circuit 18. The drive duties are set as described below from the thus obtained value of Ts. In the third example the drive duties are set by the following equations.

$$DXlim = A1 \ (Ts - B0) \text{ (which should be not more than 100\%)}$$

$$DYlim = A1 \ (Ts - B0) \text{ (which should be not more than 100\%)}$$

In the equations A1 and B0 are constants.

In the fourth example the values of drive duty are set as follows.

If Ts>0° C.,

DXlim=100%;

DYlim=100%.

For other Ts,

DXlim=50%;

DYlim=50%.

Figure 3B:
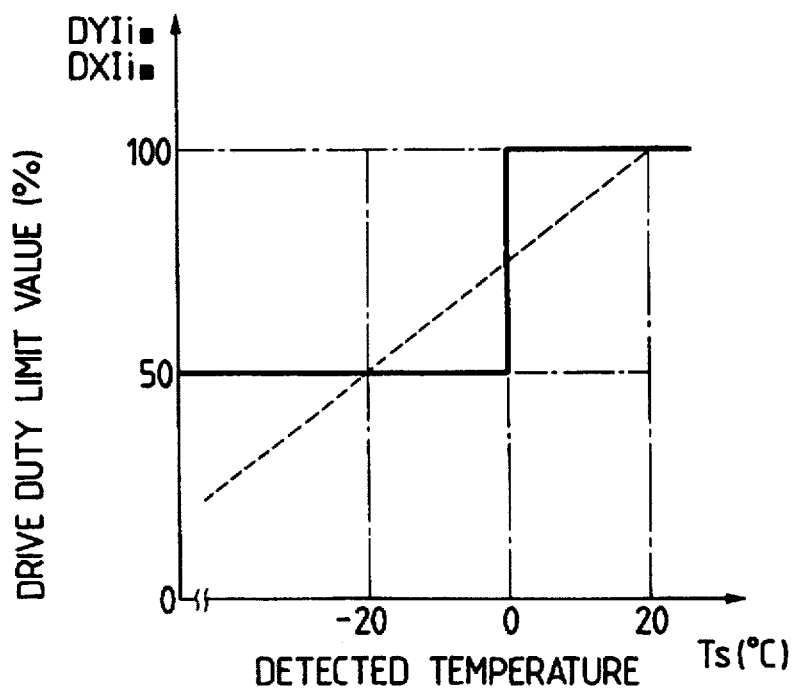

FIG. 3B shows the relation between the Ts value and the limits of drive duty. In FIG. 3B, a broken line shows the first example with A1=1.25 and B0=−60° C., and a solid line shows the second example.

The third example is next described referring to the flowchart in FIG. 11. Starting from Step S400, the flow goes to Step S401 to set the value of the detected temperature by the temperature detecting circuit 18 into the variable Ts. Next at Step S402 A=A1 (Ts−B0) is calculated. After obtaining A, the flow goes to Step S403. At Step S403 whether A>100% is judged. Unless A>100% then the flow goes to Step S405. If A>100% then the flow goes to Step S404 to set A=100%. Then the flow goes to Step S405. At Step S405 the limit value set for A is output through the DXlim terminal or through the DYlim terminal. At Step S406 the limit value setting process of drive duty is completed.

The fourth example is next described referring to the flowchart in FIG. 12. Starting from Step S500, the flow goes to Step S501 to set the value of the detected temperature by the temperature detecting circuit 18 into the variable Ts. Next Step S502 whether Ts>0° C. is judged. Unless Ts>0° C., then the flow goes to Step S503 to set A=50%. Then the flow goes to Step S505. If Ts>0° C. then the flow goes to Step S504 to set A=100%. Then the flow goes to Step S505. At Step S505 the limit value set for A is output through the DXlim terminal or through the DYlim terminal. At Step S507 the limit value setting process of the drive duty is finished.

Figure 13:
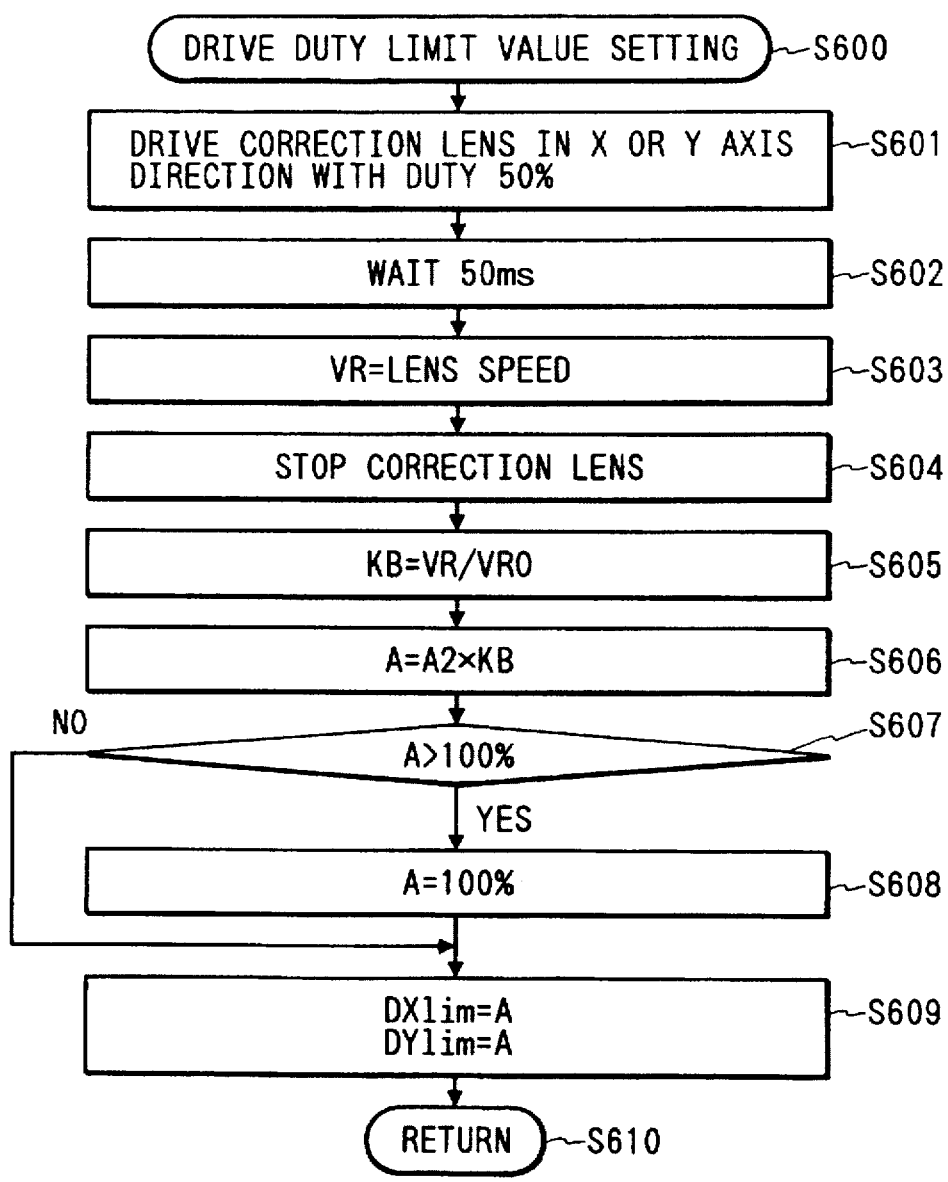
FIG. 13 is a flowchart to show an example of a limit value setting process of a drive duty in an embodiment of a camera-shake correcting camera according to the present invention.
Figure 14:
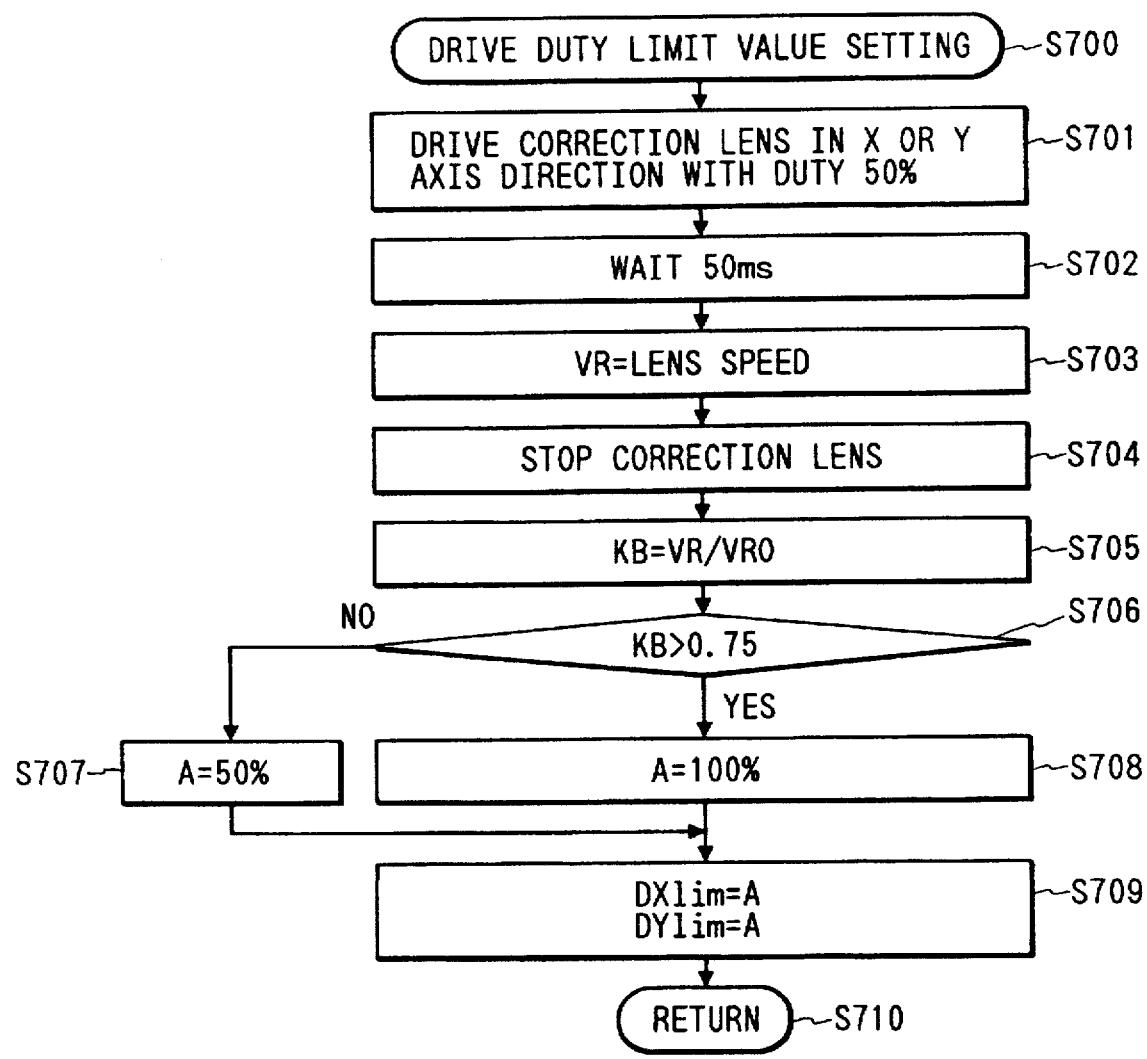
FIG. 14 is a flowchart to show an example of a limit value setting process of a drive duty in an embodiment of a camera-shake correcting camera according to the present invention.

Next described with FIG. 13 and FIG. 14 are fifth and sixth examples in which the limit values of drive duty are set by detecting a moving speed of correction lens 13 in steady motion.

The motor 7 or the motor 8 is driven at a certain duty to move the correction lens 13. When the moving speed of correction lens 13 reaches a steady state (which is defined at 50 ms after drive start in FIG. 13 and in FIG. 14), the velocity of the correction lens 13 is monitored by the X-axis lens position and velocity detecting circuit 9 or the Y-axis lens position and velocity detecting circuit 10 to check the current supply capability of the battery from the detected velocity. Letting VR be the detected velocity and VR0 be a velocity of correction lens 13 with a new battery used at the ordinary temperature, the current supply capability KB of the battery is expressed by the following equation (KB is called as battery index).

$$KB=VR/VR0$$

When a new battery is used at the ordinary temperature, KB is about 1. This value gradually decreases as the battery is being discharged. The drive duties are set as described below from the thus obtained value of KB. In the fifth example the values of drive duty are set by the following equations.

$$DXlim=A2\times KB \text{ (which should be not more than 100\%)}$$

$$DYlim=A2\times KB \text{ (which should be not more than 100\%)}$$

In the equations A2 is a positive constant.

In the sixth example the values of drive duty are set as follows.

If KB>0.75,

DXlim=100%;

DYlim=100%.

For other KB,

DXlim=50%;

DYlim=50%.

FIG. 3A shows the relation between the KB value and the limits of drive duty. In FIG. 3A a broken line represents the fifth example with A2=100 and a solid line represents the sixth example.

The fifth example is next described referring to the flowchart in FIG. 13. Starting from Step S600, the flow goes to Step S601 to start driving the correction lens 13 at a drive duty of 50% only along a single axis (along the X axis or along the Y axis). Flow waits at Step S602 until the moving velocity of correction lens 13 reaches 50 ms. At Step S603 the moving velocity of the lens is detected along the driving axis of either the X axis or Y axis by the X-axis lens position and velocity detecting circuit 9 or the Y-axis lens position and velocity detecting circuit 10, to set the detected value into the variable VR. The correction lens 13 is stopped at Step S604. After completion of process at Step S604, KB=VR/VR0 is calculated at Step S605. At Step S606, A=A2×KB is calculated to obtain A. Then the flow goes to Step S607. At Step S607 whether A>100% is judged. Unless A>100%, then the flow goes to Step S609. If A>100% then the flow goes to Step S608 to set A=100%. Then the flow goes to Step S609. At Step S609 the limit value set for A is output through the DXlim terminal or through the DYlim terminal. At Step S610, the limit value setting process of drive duty is finished.

The sixth example is next described referring to the flowchart in FIG. 14. Starting from Step S700, the flow goes to Step S701 to start driving the correction lens 13 at drive duty of 50% only along a single axis (along the X axis or along the Y axis). Flow waits at Step S702 until the moving velocity of correction lens 13 reaches 50 ms. At Step S703 the moving velocity of the lens is detected along the driving axis by the X-axis lens position and velocity detecting circuit 9 or Y-axis lens position and velocity detecting circuit 10, to set the detected value into the variable VR. At Step S704 the correction lens 13 is stopped. After completion of process at Step S704, KB=VR/VR0 is calculated at Step S705 to obtain KB. After that, the flow goes to Step S706. At Step S706 whether KB>0.75 is judged. Unless KB>0.75, then the flow goes to Step S707 to set A=50%. Then the flow goes to Step S709. If KB>0.75 then the flow goes to Step S708 to set A=100%. Then the flow goes to Step S709. At Step S709 the limit value set for A is output through the DXlim terminal or through the DYlim terminal. At Step S710 the limit value setting process of drive duty is finished.

Next described is the relation between the limit values of drive duty and the drive duty limiting circuit.

The thus set limit values of drive duty are output through the DXlim terminal and through the DYlim terminal of CPU 1 to the drive duty limiting circuit 5 and to the drive duty limiting circuit 6, respectively. The drive duty limiting circuit 5 and the drive duty limiting circuit 6 make respective limits on the X-axis drive duty and the Y-axis drive duty output from the |DX| terminal and the |DY| terminal of CPU 1. The thus limited X-axis and Y-axis drive duties are supplied to the energization timing control circuit 4 to be then output from the X-axis motor drive circuit 2 and from the Y-axis motor drive circuit 3 to the motor 7, and to the motor 8, respectively.

As described above, the limit values of drive duty can be set for the motor 7 and the motor 8 by detecting: the battery check voltage, the temperature detection value, or the moving velocity of correction lens 13 in steady motion. Thus, the motor 7 and the motor 8 may be driven at a duty lower than the set drive duty. The limit values of drive duty are set smaller as the current supply capability of the battery drops. In contrast, no limit is set if the current supply capability of the battery is sufficiently high.

Figure 15:
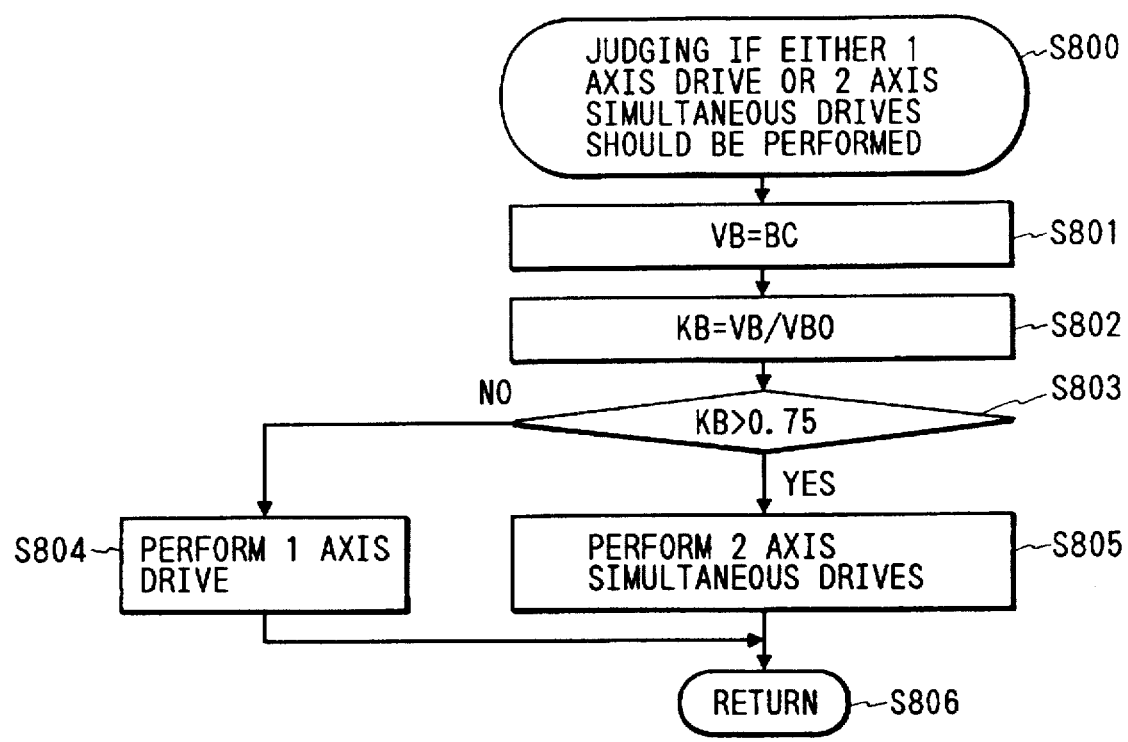
FIG. 15 is a flowchart to show an example of a single-axis drive or double-axes simultaneous drive judging process in an embodiment of a camera-shake correcting camera according to the present invention.
Figure 16:
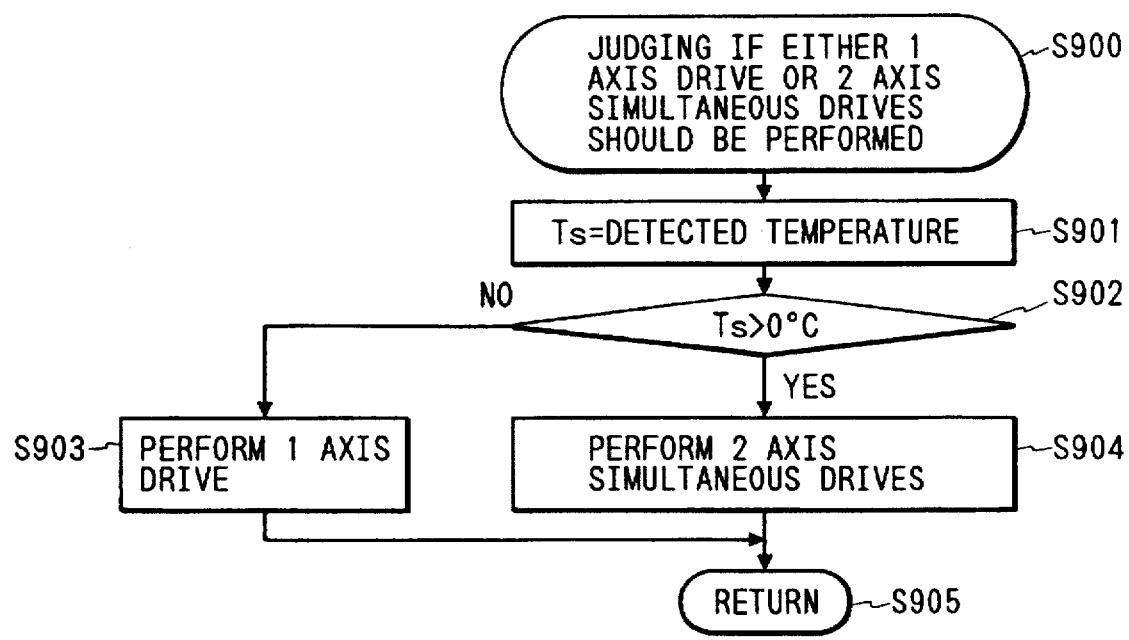
FIG. 16 is a flowchart to show an example of a single-axis drive or double-axes simultaneous drive judging process in an embodiment of a camera-shake correcting camera according to the present invention.
Figure 17:
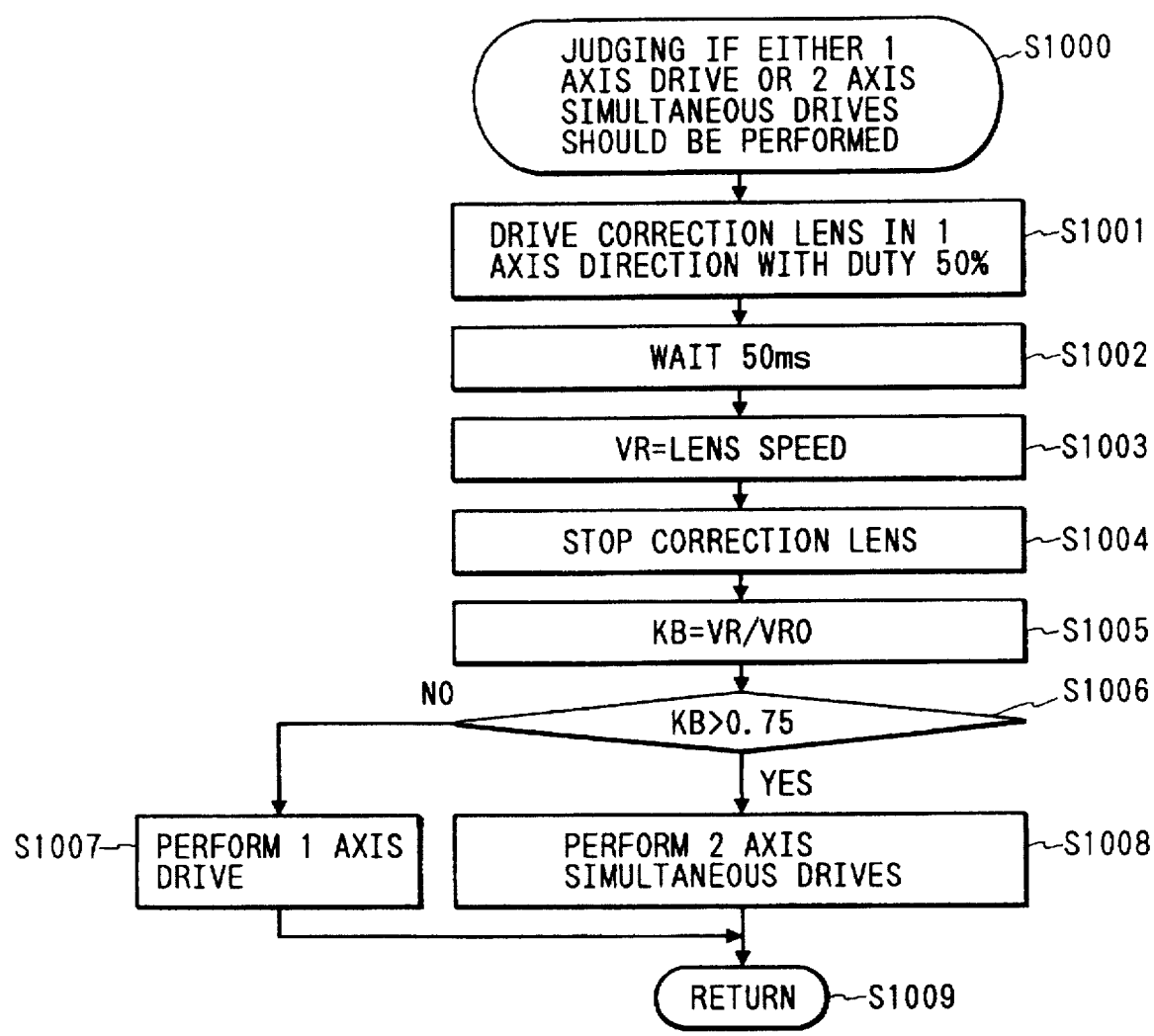
FIG. 17 is a flowchart to show an example of a single-axis drive or double-axes simultaneous drive judging process in an embodiment of a camera-shake correcting camera according to the present invention.

Next described is the 1-axis drive or 2-axis simultaneous drive judging process shown at Step S102 in FIG. 8. FIG. 15, FIG. 16 and FIG. 17 show three examples of the 1-axis drive or 2-axis simultaneous drive judging process, by either one of which the 1-axis drive or 2-axis simultaneous drive judging process can be carried out. The three examples will be described one by one in the following.

The first example is described with FIG. 15, in which the 1-axis drive or 2-axis simultaneous drive judging process is based on the battery check voltage.

Let VB be an output voltage from BC circuit 17. Letting VB0 be a voltage when a new battery is used at the ordinary temperature, the current supply capability KB of battery is expressed by the following equation.

$$KB=VB/VB0$$

When a new battery is used at the ordinary temperature, KB=1. This value gradually decreases as the battery is being discharged. The 1-axis drive or 2-axis simultaneous drive judging process is carried out as described below, using the thus obtained value of KB.

If KB>0.75, the 2-axis simultaneous drive is selected.

For other KB, the 1-axis drive is selected.

The first example is described referring to the flowchart of FIG. 15. Starting from Step S800, the flow goes to Step S801 to set the output voltage (BC voltage) from BC circuit 17 to VB. Next at Step S802 KB=VB/VB0 is calculated to obtain KB. Then the flow goes to Step S803. At Step S803 whether KB>0.75 is judged. Unless KB>0.75 then the flow goes to Step S804 to select the 1-axis drive. Then the flow goes to Step S806. If KB>0.75, then the flow goes to Step S805 to select the 2-axis simultaneous drive. Then the flow goes to Step S806 to conclude the 1-axis drive or 2-axis simultaneous drive judging process.

The second example is described with FIG. 16 in which the 1-axis drive or 2-axis simultaneous drive judging process is based on the temperature detection.

FIG. 16 shows the second example, in which the 1-axis drive or 2-axis simultaneous drive judging process is carried out by using an output value from the temperature detecting circuit 18. Let Ts be a detected temperature by the temperature detecting circuit 18. The 1-axis drive or 2-axis simultaneous drive judging process is performed as described below, using the thus obtained value of Ts.

If Ts>0° C.,
the 2-axis simultaneous drive is selected.
For other Ts,
the 1-axis drive is selected.

The second example is described referring to the flowchart in FIG. 16. Starting from Step S900, the flow goes to Step S901 to set a detected temperature by the temperature detecting circuit 18 to Ts. Then at Step S902 whether Ts>0° C. is judged. Unless Ts>0° C. then the flow goes to Step S903 to select the 1-axis drive. Then the flow goes to Step S905. If Ts>0° C. then the flow goes to Step S904 to select the 2-axis simultaneous drive. Then the flow goes to Step S905 to conclude the 1-axis drive or 2-axis simultaneous drive judging process.

The third example is next described with FIG. 17, in which the 1-axis drive or 2-axis simultaneous drive judging process is carried out by using a moving velocity of correction lens in steady motion.

The third example is an example in which the 1-axis drive or 2-axis simultaneous drive judging process is carried out by using a moving velocity of correction lens 13 in steady motion. The motor 7 or the motor 8 is driven at a certain duty to move the correction lens 13. When the moving velocity of correction lens 13 reaches a steady state (which is defined at 50 ms from the drive start in FIG. 17), the velocity of correction lens 13 is monitored by the X-axis lens position and velocity detecting circuit 9 or by the Y-axis lens position and velocity detecting circuit 10, to check the current supply capability of the battery from the detected velocity. Letting VR be the detected velocity and VR0 be a velocity of correction lens 13 when a new battery is used at the ordinary temperature, the current supply capability KB of the battery is expressed by the following equation.

$$KB=VR/VR0$$

When a new battery is used at the ordinary temperature, KB is about 1. This value gradually decreases as the battery is being discharged. The 1-axis drive or 2-axis simultaneous drive judging process is carried out as described below, using the thus obtained value of KB.

If KB>0.75,
the 2-axis simultaneous drive is selected.
For other KB,
the 1-axis drive is selected.

The third example is further described referring to the flowchart in FIG. 17. Starting from Step S1000, the flow goes to Step S1001 to start driving the correction lens 13 at a drive duty of 50% only along a single axis (along the X axis or along the Y axis). At Step S1002 a time period of 50 ms elapses. At Step S1003 a moving velocity of the lens is detected along the driving axis by the X-axis lens position and velocity detecting circuit 9 or by the Y-axis lens position and velocity detecting circuit 10, to set the detected value to VR. At Step S1004 the correction lens 13 is stopped. After completion of the process at Step S1004, KB=VR/VR0 is calculated at Step S1005 to obtain KB. Then the flow goes to Step S1006. At Step S1006 whether KB>0.75, is judged. Unless KB>0.75 then the flow goes to Step S1007 to select the 1-axis drive. Then the flow goes to Step S1009. If KB>0.75 the 2-axis simultaneous drive is selected. Then the flow goes to Step S1009 to conclude the 1-axis drive or 2-axis simultaneous drive judging process.

Next described is the relation between the 1-axis drive or 2-axis simultaneous drive judging process and the main flowchart in FIG. 8.

The 1-axis drive or 2-axis simultaneous drive judging process is started by a subroutine call at Step S102 in FIG. 8. Based on the processing result, it is judged whether each of the centering processes and the reset processes of correction lens 13 should be carried out simultaneously on the two axes or separately, on one after another axis at Step S103 or at Step S109. This judgement determines that the 2-axis simultaneously drive is executed if the current supply capability of battery is relatively high but the 1-axis drive in which the correction lens 13 is driven separately on one after another axis if the current supply capability of battery is relatively low.

The following advantages may be enjoyed by the embodiments of the present invention as described above.

When the current supply capability of the battery is low, the centering or reset drive of the correction lens is conducted separately for each axis, which reduces the load on the battery as compared with the two-axis drive. This can prevent the camera system from failing to operate due to a drop of battery voltage during centering or reset of the correction lens and enables the BC warning voltage to be set lower than that of conventional cameras. In addition, when the current supply capability of the battery is high, the centering or reset drive of the correction lens is carried out simultaneously for the two axes, which can reduce the time necessary for the centering process or reset process.

Also, when the current supply capability of the battery is low, the drive motor for correction of the lens is not driven at a duty more than the set duty, which reduces the load on battery. This can prevent the camera system from failing to operate due to a drop of battery voltage during centering or reset of the correction lens or during camera-shake control, and enables the BC warning voltage to be set lower than that of conventional cameras. In addition, when the current supply capability of the battery is high, no restriction of drive duty is forced, which can reduce the time necessary for the centering process or reset process. Further, since no restriction of drive duty is forced, the control range of the velocity of correction lens can be set larger, which enables greater shake-proof control of camera shake.

Further, since the energization timings for the X axis and for the Y axis of the correction lens are shifted relative to each other, the two motors are not energized at the same time if the drive duty for driving the drive motor of the correction lens is low. This reduces the load on the battery. This arrangement can prevent the camera system from failing to operate due to a drop of battery voltage during centering or reset of the correction lens or during shake-proof control, and enables the BC warning voltage to be set lower than that of conventional cameras.

The present invention was described above with the preferred embodiments, and it should be noted that various modifications are possible according to the technical idea of the present invention. For example, although the camera shake correction is effected by moving the correction lens in the above embodiments, the present invention is not limited to the camera shake correction by moving the correction lens. For example, the present invention can be applied to the camera shake correction by moving a correction prism.

Also, although the above embodiments illustrate the examples in which the camera-shake correcting means is moved by a motor, the camera-shake correcting means can be moved by other drive means than the motor, such as a solenoid.

Further, although the above embodiments illustrate the examples in which the camera shake was corrected by moving the camera-shake correcting means by means of two motors in the two axis directions, the camera-shake correcting means can be moved in directions of more than two axes, or the camera-shake correcting means can be moved by more than two motors.

As described above, the present invention can provide a camera with a camera-shake correcting function, which can assure the normal operation of a camera system without setting the BC voltage higher. Though the present invention camera-shake correcting camera, the drive duty limit value setting means for changing the limit value of drive duty limiting means in accordance with an output value from battery check means, or the drive mode judging means is provided for judging if the camera-shake correcting means should be driven to a predetermined position either in the first home position drive mode or in the second home position drive mode.

What is claimed is:

1. A camera-shake correcting camera in which camera-shake correcting means forming a part of a phototaking optical system is moved by a plurality of drive means to correct camera shake and drive control of said plurality of drive means is performed by controlling a drive duty of energization time in a predetermined period, comprising:

battery check means for checking a current supply capability of a power battery for operation of the camera;

drive duty limiting means for inhibiting said plurality of drive means for driving said camera-shake correcting means from driving said camera-shake correcting means at a drive duty more than a set limit value; and drive duty limit value setting means for changing to set the limit value of said drive duty limiting means in accordance with an output value from said battery check means.

2. A camera-shake correcting camera in which camera-shake correcting means forming a part of a phototaking optical system is moved by a plurality of drive means to correct camera shake and drive control of said plurality of drive means is performed by controlling a drive duty of energization time in a predetermined period, comprising:

battery check means for checking a current supply capability of a power battery for operation of the camera;

drive control means having a first home position drive mode in which said plurality of drive means are simultaneously drive-controlled to move said camera-shake correcting means to a predetermined position and a second home position drive mode in which said plurality of drive means are separately driven one after another to move said camera-shake correcting means to the predetermined position; and drive mode judging means for judging whether said camera-shake correcting means should be driven to the predetermined position either in said first home position drive mode or in said second home position drive mode in accordance with an output value from said battery check means;

wherein said drive control means drive-controls said plurality of drive means in accordance with the output value from said drive mode judging means.

3. A camera-shake correcting camera according to claim 1, wherein said battery check means is voltage detecting means for checking a voltage of the power battery for operation of the camera.

4. A camera-shake correcting camera according to claim 1, wherein said battery check means is temperature detecting means for detecting an ambient temperature around the power battery for operation of the camera.

5. A camera-shake correcting camera according to claim 1, wherein said battery check means is moving velocity detecting means for detecting a moving velocity of said camera-shake correcting means in a steady state when at least one drive means is driven out of said plurality of drive means.

6. A camera-shake correcting camera according to claim 1, further comprising energization timing control means for shifting energization timings for said plurality of drive means for driving said camera-shake correcting means relative to each other.

7. A camera-shake correcting camera in which camera-shake corrector forming a part of a phototaking optical system is moved by a plurality of drivers to correct camera shake and drive control of said plurality of drivers is performed by controlling a drive duty of energization time in a predetermined period, comprising:

battery checker for checking a current supply capability of a power battery for operation of the camera;

drive duty limiter for inhibiting said plurality of drive means for driving said camera-shake correcting means from driving said camera-shake correcting means at a drive duty more than a set limit value; and drive duty limit value setter for changing to set the limit value of said drive duty limiter in accordance with an output value from said battery checker.

8. A camera-shake correcting camera in which camera-shake corrector forming a part of a phototaking optical system is moved by a plurality of drivers to correct camera shake and drive control of said plurality of drivers is performed by controlling a drive duty of energization time in a predetermined period, comprising:

battery checker for checking a current supply capability of a power battery for operation of the camera;

drive controller having a first home position drive mode in which said plurality of drivers are simultaneously drive-controlled to move said camera-shake corrector to a predetermined position and a second home position drive mode in which said plurality of drivers are separately driven one after another to move said camera-shake corrector to the predetermined position; and drive mode judging means for judging whether said camera-shake corrector should be driven to the predetermined position either in said first home position drive mode or in said second home position drive mode in accordance with an output value from said battery checker;

wherein said drive controller drive-controls said plurality of drivers in accordance with the output value from said drive mode judging means.

9. A camera-shake correcting camera in which a camera-shake correcting lens forming a part of an optical system is moved to a predetermined position by first and second drivers to correct camera shake, said camera comprising:

a power battery;

a battery checker which checks a current supply capability of said power battery;

a drive mode judging device to judge whether said first and second drivers are to be driven simultaneously or separately one after another in accordance with an output of said battery checker; and a controller which controls the first and second drivers in accordance with the judgement of said drive mode judging device.

10. A camera-shake correcting camera in which a camera-shake corrector forming a part of a phototaking optical system is moved by a plurality of drivers to correct camera shake and in which drive control of said plurality of drivers is performed by controlling a drive duty of an energization time in a predetermined period, comprising:

a temperature detecting device to detect a temperature of the camera-shake correcting camera and output a corresponding value;

a drive controller having a first home position drive mode in which said plurality of drivers are simultaneously drive-controlled to move said camera-shake corrector to a predetermined position and a second home position drive mode in which said plurality of drivers are separately driven one after another to move said camera-shake corrector to the predetermined position; and a drive mode judging device to judge whether said camera-shake corrector should be driven to the predetermined position either in said first home position drive mode or in said second home position drive mode, said drive mode judging device outputting a value in accordance with the output value from said temperature detecting device;

wherein said drive controller drive-controls said plurality of drivers in accordance with the output value from said drive mode judging device.

11. A method for correcting camera-shake of a camera in which a camera-shake correcting lens forming a part of a phototaking optical system is moved, by first and second drivers to correct camera shake, comprising the steps of:

checking a current supply capability of a power battery for operation of the camera;

judging whether said camera-shake correcting lens should be driven to a predetermined position either in a first home position drive mode in which said first and second drivers are driven simultaneously or in a second home position drive mode in which said first and second drivers are driven separately one after another; and performing drive control of said first and second drivers by controlling a drive duty of energization time in a predetermined period.

12. A method for correcting camera-shake of a camera in which a camera-shake corrector forming a part of a photo-taking optical system is moved by a plurality of drivers to correct camera shake, and in which a drive controller has a first home position drive mode in which the plurality of drivers are simultaneously drive-controlled to move the camera-shake corrector to a predetermined position and a second home position drive mode in which the plurality of drivers are separately driven one after another to move said camera-shake corrector to the predetermined position, comprising the steps of:

checking a current supply capability of a power battery for operation of the camera;

judging whether said camera-shake corrector should be driven to the predetermined position either in said first home position drive mode or in said second home position drive mode in accordance with an electric voltage; and controlling a drive duty of energization time of the plurality of drivers in a predetermined period.

13. A camera-shake correcting camera comprising:

a first lens for transmitting and focusing light passing therethrough;

an x-axis angular velocity detecting circuit for detecting an x-axis angular velocity of a camera and outputting a corresponding x-axis value;

a y-axis angular velocity detecting circuit for detecting a y-axis angular velocity of the camera and outputting a corresponding y-axis value;

a camera-shake correcting lens for receiving the light passing through the first lens;

a first motor connected to the camera-shake correcting lens for driving the camera-shake correcting lens at a velocity corresponding to the x-axis value;

a second motor connected to the camera-shake correcting lens for driving the camera-shake correcting lens at a velocity corresponding to the y-axis value;

a drive controller having a first home position drive mode in which said first and second motors are simultaneously drive-controlled to move said camera-shake correcting lens to a predetermined position and having a second home position drive mode in which said first and second motors are separately driven one after another to move said camera-shake correcting lens to the predetermined position; and a drive mode judging device to judge whether said camera-shake correcting lens should be driven to the predetermined position either in said first home position drive mode or in said second home position drive mode, said drive mode judging device outputting a value in accordance with the y-axis value and the x-axis value;

wherein said drive controller drive-controls said first and second motors in accordance with the output value from said drive mode judging device.

\* \* \* \* \*